United States Patent [19]

Depoitier et al.

[11] 4,082,952

[45] Apr. 4, 1978

[54] ION DETECTOR

[75] Inventors: Jacques Depoitier; Romain Vinchent, both of Wanfercee-Baulet, Belgium

[73] Assignee: Institut National des Radio-elements - Nationaal Instituut voor Radio-elementen, en abrege: "I.R.E.", Brussels, Belgium

[21] Appl. No.: 704,601

[22] Filed: Jul. 12, 1976

[30] Foreign Application Priority Data

Jul. 11, 1975 Belgium ................................ 831296

[51] Int. Cl.² ................................................ G01T 1/18
[52] U.S. Cl. .................................... 250/381; 250/385
[58] Field of Search ................................ 250/381, 385

[56] References Cited

U.S. PATENT DOCUMENTS

| | | | |
|---|---|---|---|
| 3,448,261 | 6/1969 | Amiragoff | 250/381 |
| 3,500,368 | 3/1970 | Abe | 250/385 |
| 3,710,110 | 1/1973 | Lampart et al. | 250/381 |
| 3,935,492 | 1/1976 | Sasaki et al. | 250/381 |

OTHER PUBLICATIONS

"Ionization in Pure Gases —" by Jesse et al., Physical Review, vol. 97, No. 6, 3/13/55, pp. 1668–1669.

*Primary Examiner*—Harold A. Dixon
*Attorney, Agent, or Firm*—Sughrue, Rothwell, Mion, Zinn and Macpeak

[57] ABSTRACT

Axially aligned conductive metal cylindrical members on opposite sides of a printed circuit plate define a first measuring chamber and a second reference chamber on opposite sides thereof. The bottom of one cylindrical member forms the first electrode of the reference chamber and a plate closing off the end of the measuring chamber remote from the printed circuit plate forms the first electrode of the measuring chamber. Radioactive sources are mounted to the first electrode of respective chambers and a rod projects through the printed circuit plate coaxial with the first and second cylindrical members and terminates short of the plate closing off the first chamber and the bottom of the second chamber cylindrical member, the second electrodes for the chambers mounted respectively at the ends of the rod, and wherein the second electrode of the first chamber comprises a flat apertured portion in parallel with the plate overlying the end of the first cylindrical member remote from the printed circuit plate with the first cylindrical member plate defining a flat surface.

7 Claims, 4 Drawing Figures

ION DETECTOR

This invention relates to an ion detector comprising two ionizing chambers each one of which has at least one wall which is a good electricity conductor forming a first electrode, a second electrode inside the chamber and an $\alpha$ radio-active source, the wall of the first chamber, the so-called measuring chamber, being at least partly apertured, the wall of the second chamber, the so-called reference chamber, being plain.

Such detectors are known and are notably used in fire alarms.

One object of this invention is to provide an ion detector which is operatable with a relatively low supply voltage, for instance in the range of 12 volts.

This object is obtained notably by designing a measuring chamber for which the curve $i = f(V)$ is as steep as possible without however reaching the saturation. $i$ is the current generated inside the measuring chamber according to the voltage (V) between the electricity-conducting wall comprising the first electrode of this chamber and the second electrode inside said chamber.

For this purpose, the $\alpha$ radio-active source is laid inside the measuring chamber against a flat surface of the chamber wall, the second electrode of said chamber having a flat apertured portion in parallel relationship with said flat surface and a rod at right angle to said flat surface and located on the other side of the flat apertured portion relative to said flat surface.

In an advantageous embodiment of the invention, the flat apertured portion of the second electrode of the measuring chamber is comprised of at least one wire shaped as a circle concentric with the rod and of at least two wires connecting the circle-shaped wire to said rod.

In a particular embodiment, the ion detector according to the invention comprises inside the measuring chamber, one element movably arranged between the radio-active source and the flat portion of the second electrode.

In a preferred embodiment of the invention, the measuring chamber rod extends to the reference chamber, inside which said rod bears a plain flat portion in parallel relationship with a flat surface of that reference chamber wall to which is applied the $\alpha$ radio-active source of said chamber, said plain flat portion forming the second electrode of said reference chamber.

In a further particular embodiment of the invention, the spacing between that plain flat portion forming the reference chamber second electrode and the $\alpha$ radio-active source of said chamber lies in the range of 2 mm.

Other details and features of the invention will stand out from the description given below by way of non limitative example and with reference to the accompanying drawings, in which:

In FIGS. 1 to 3, the same reference numerals pertain to similar elements.

Figure 1:
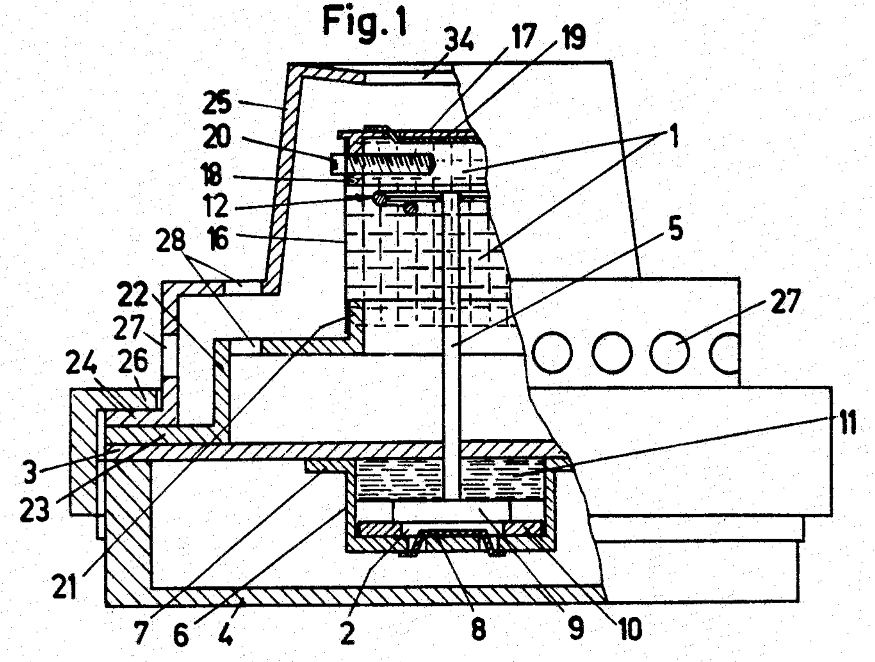
FIG. 1 is a view partly in elevation and partly in section of an ion detector according to the invention.
Figure 2:
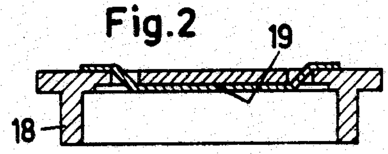
FIG. 2 shows on a larger scale the cross-section part of FIG. 1.
Figure 3:
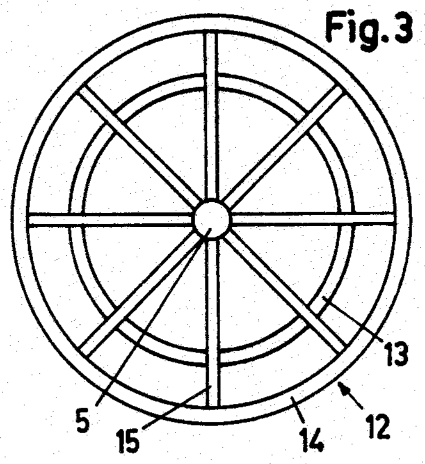
FIG. 3 is a plan view of a flat portion of the measuring chamber second electrode of the ion detector shown in FIGS. 1 and 2.
Figure 4:
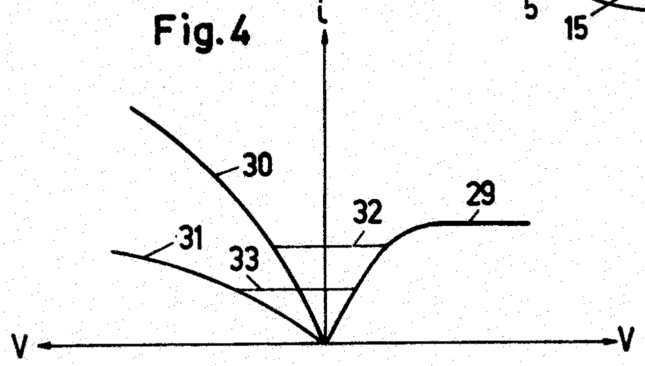
FIG. 4 is a diagram showing together the curve $i = f(V)$ for the reference chamber and two curves $i = f(V)$ for the measuring chamber.

The ion detector shown in FIGS. 1 to 3 comprises a so-called measuring chamber 1 and a so-called reference chamber 2. The various elements comprising said chambers are mounted on a plate 3 comprising a printed circuit to which the electrodes of both chambers, the voltage source and the alarm device are connected. Electric lay-outs in which ion detectors such as the one according to this invention can be incorporated are known. The electric wiring will consequently not be described and has not been shown.

The plate 3 bears on the edge of a base 4. A rod 5 goes through plate 3. The one end of said rod lies inside a sleeve 6 located in base 4. Said sleeve comprises a rim 7 applied against plate 3 and made fast thereto by means not shown. Sleeve 6 which is for instance made of an aluminium alloy, comprises a radio-active source of $\alpha$ radiation, for example a source of americium 241. Such sources are in the shape of a strip 8. For this purpose, two openings have been made to let the ends of strip 8 through. Said strips ends are thus located outside sleeve 6. The strip does not seal completely said openings, in such a way that the so-called reference chamber 2 is closed but is not sealed tightly. This lack of tightness allows the build-up of the atmospheric pressure inside said chamber 2, which results in automatically compensating the changes in the measuring chamber ion current which are due to the changes of said atmospheric pressure.

Said chamber 2 is closed on the other side by a plain flat part 9 of disk shape. Said disk from a metal which is a good electricity conductor, is integral with rod 5 and forms the second electrode of the so-called reference chamber 2, the first electrode of said chamber being formed by the bottom of sleeve 6.

The disk 9 is retained at a distance of about 2 mm from the bottom of sleeve 6; the spacing between the plain flat portion 9 of disk shape forming the second electrode of the reference chamber 2 and the radio-active source 8 of said chamber is thus about 2 mm.

The spacing between the bottom of sleeve 6 and disk 9 is retained by means of a ring 10 made from Teflon. The disk 9 is retained between said ring 10 and a plug 11 also made from Teflon which is slid on rod 5 and bears on plate 3.

The rod 5 extends on the other side of plate 3 relative to reference chamber 2. At the end thereof lying on said other side, rod 5 bears a substantially flat apertured part 12 that extends in a plane at right angle to the rod. Said flat apertured part which is shown generally in 12, is comprised of two wires 13 and 14 of circle shape. Both said circles are concentric with rod 5 as shown in FIG. 3. Said wires 13 and 14 are connected together and to rod 5 by means of a series of wires 15 arranged along the circle radiuses. Said wires 13, 14 and 15 forming the flat apertured part are also made of a metal which is a good electricity conductor. The rod 5 and the flat apertured part form together the second electrode of measuring chamber 1. Said measuring chamber is notably bounded by a cylindrical wall 16 which is a good electricity conductor. Said wall forms the first electrode of the measuring chamber 1 and it is comprised of a cylindrical netting from stainless steel wire. The second electrode of said chamber is formed by the flat apertured part 12 and by rod 5.

An upright rim 18 of a plate 17 is crimped in the one end of the cylindrical netting 16. Said metal plate 17 forms the bottom of measuring chamber 1. A radio-active source with $\alpha$ radiation is applied inside chamber 1 on said plate 17 which comprises a flat portion of the wall bounding the chamber. The source 19 of the measuring chamber 1 is mounted in the same way as the source 8 of the reference chamber 2. The second electrode of measuring chamber 1 thus comprises a flat apertured part 12 in parallel relationship with the flat surface formed by plate 17; said second electrode of measuring chamber 1 also comprises the rod 5 at right angle to that flat surface formed by plate 17; said rod 5 is located on the other side of flat apertured part 12 relative to plate 17. A threaded rod 20 is screwed through cylindrical netting 16 into the upright rim 18 of plate 17. Said threaded rod may partly mask radioactive source 19 and thus allows to adjust the ionizing rate inside chamber 1 under the action of source 19.

On the opposite side relative to plate 17, the cylindrical netting 16 is pressed against rim 21 of a metal bell 22. Said metal bell is open on the netting side and further comprises a rim 23 extending in a vertical plane passing through the axis of cylindrical wall 16. Said rim 23, a rim 24 on a cover 25 and plate 3 are retained on the edge of base 4 by means of threaded ring 26. Said threaded ring 26 is screwed on base 4.

The cover 25 is provided all around with holes letting smoke inside said cover and therefrom through netting 16 into measuring chamber 1. The smoke may escape from said cover through center opening 34.

Openings 28 are provided in bell 22 and in cover 25 for the passage of a pilot light not shown, which may be mounted on plate 3 in the electric wiring (not shown).

The features of the ion detector as shown and described above are particularly advantageous. Everything helps to provide as large a difference as possible between the rest condition (lack of smoke) and the alarm condition (presence of smoke) inside the measuring chamber 1. The curve 29 relating to reference chamber 2 is rapidly saturated. This is obtained due to the second electrode 9 of said chamber being a plain disk in parallel relationship with the flat surface of the same chamber on which is arranged the $\alpha$ radio-active source 8 and because the spacing between disk 9 and $\alpha$ radioactive source 8 is but about 2 mm. Such narrow spacing and the fact that both chamber electrodes lie in parallel relationship allows one to obtain a strong enough electrical field. As the free travel of an $\alpha$ particle is about 2 cm, there is not produced as many ions as it would be possible with such a source but this but an apparent drawback as the saturation current obtained is large enough to operate transistors of the kind used in electronics circuits co-operating with ion detectors to control fire alarms.

The slope of curve 30 for the measuring chamber 1 when there is no smoke should be as steep as possible without however reaching the saturation. This is obtained by using in the measuring chamber 1 a second electrode that comprises two portions. The first portion 12 which is flat, apertured and in parallel relationship with the flat surface 17 of the first electrode bearing the radio-active source is located at a short distance for instance of about 6 mm, from said source 19. The spacing between the plate 17 forming said first electrode flat portion and the second electrode flat apertured portion 12 is short enough for all of the ions formed within the dielectric to be captured. This results in the steep slope for curve 30. However, these ions which are formed by the $\alpha$ particles over that travel portion thereof over about 2cm beyond the flat apertured portion 12 are not lost inside measuring chamber 1. Indeed particles may go through the flat apertured portion 12 and the ions formed beyond said flat apertured portion are captured by rod 5. The fact that the second electrode of measuring chamber 1 comprises on the one hand a flat apertured portion in parallel relationship with the flat surface of the first electrode bearing the $\alpha$ radio-active source and on the other hand a rod at right angle to said flat surface 17 and located on the other side of flat apertured portion 12 relative to said flat surface 17 allows to obtain a curve 30 having a steep slope which does not at the same time reach the saturation.

The curve 31 shown in FIG. 5 corresponds to the presence of smoke inside the measuring chamber 1.

Due to the potential difference between the first electrodes of chambers 1 and 2 having a constant value, it will be understood that the working level without smoke being present lies along line 32 and in the presence of smoke along line 33. It will be noticed in FIG. 2 that the difference between both conditions is optimum.

The threaded rod allowing adjustment of the detector sensitivity is arranged in the measuring chamber between the source 19 and the flat portion 12 of the second electrode. Said threaded rod gradually hides the source which reduces the number of ions collected by the second electrode. The function of said threaded rod is thus similar to the function of the smoke particles. Consequently the detector sensitivity can thus be increased.

It is to be noticed that bell 22 forms a Faraday cage that screens the electric components and thus minimizes the stray inductions.

It is to be noticed that the invention is in no way limited to the above embodiments and that many changes can be brought therein without departing from the scope of the invention as defined by the appended claims.

We claim:

1. An ion detector comprising:

a printed circuit plate, axially aligned conductive metal cylindrical members on opposite sides of said printed circuit plate one of said cylindrical members forming a first measuring chamber and the other forming a second, reference chamber, a plate closing off the end of the measuring chamber remote from said printed circuit plate and forming the first electrode of said measuring chamber, the bottom of said other cylindrical member forming the first electrode of said reference chamber, radio-active sources mounted to said first electrode of respective chambers, the cylindrical member forming said first measuring chamber being at least partly apertured, said radio-active sources being laid inside respective chambers and in contact with the plate and the bottom wall of said first chamber and second chamber cylindrical members, a rod projecting through said printed circuit plate and coaxial with said first and second cylindrical members and terminating short of said plate closing off said first chamber cylindrical member and the bottom of said second chamber cylindrical member, second electrodes for said chambers mounted respectively at the ends of said rod and facing said radioactive sources respectively, and wherein the second electrode of said first chamber comprises a flat apertured portion in parallel with the plate overlying the end of said first cylindrical member remote from said printed circuit plate, and wherein said first cylindrical member plate defines a flat surface.

2. Ion detector as defined in claim 1, in which the spacing between said second cylindrical member plate flat surface of the measuring chamber on the one hand and the flat apertured portion of the measuring chamber second electrode on the other hand is about 6mm.

3. Ion detector as defined in claim 1, in which said flat surface is comprised of the plain base of a cylinder the cylindrical wall of which is apertured.

4. Ion detector as defined in claim 1, in which the flat apertured portion of the second electrode of the measuring chamber is comprised of at least one wire shaped as a circle concentric with the rod and of at least two wires connecting the circle-shaped wire to said rod.

5. Ion detector as defined in claim 1, further comprising inside the measuring chamber, one element movably arranged between the radio-active source and the flat portion of the second electrode.

6. Ion detector as defined in claim 5, in which said element is a threaded rod screwed in the measuring chamber cylindrical member wall.

7. Ion detector as defined in claim 1, in which the rod inside the reference chamber bears a plain flat portion in parallel relationship with the bottom of the cylindrical member forming that chamber, said plain flat portion forming said second electrode of said reference chamber.

* * * * *